United States Patent [19]

Chenausky et al.

[11] 4,438,514
[45] Mar. 20, 1984

[54] SURE-START WAVEGUIDE LASER

[75] Inventors: Peter P. Chenausky, Avon; Léon A. Newman, South Windsor; Erroll H. Drinkwater, Portland, all of Conn.

[73] Assignee: United Technologies Corporation, Hartford, Conn.

[21] Appl. No.: 349,236

[22] Filed: Feb. 16, 1982

[51] Int. Cl.³ ............................................. H01S 3/03
[52] U.S. Cl. ...................................... 372/64; 372/93; 372/97; 372/102
[58] Field of Search ................ 372/64, 97, 93, 102

[56] References Cited

U.S. PATENT DOCUMENTS

| 3,845,409 | 10/1974 | Wada et al. | 372/102 |
| 3,855,547 | 12/1974 | Kirk | 372/93 |
| 3,982,204 | 9/1976 | Andringa | 372/93 |
| 4,158,821 | 6/1979 | Bresman | 372/33 |
| 4,241,319 | 12/1980 | Papayoanou | 372/97 |
| 4,352,188 | 9/1982 | Griffith | 372/82 |

Primary Examiner—William L. Sikes
Assistant Examiner—Leon Scott, Jr.
Attorney, Agent, or Firm—Eric W. Petraske

[57] ABSTRACT

An RF-discharge waveguide laser having two parallel waveguides is improved by the addition of coupling channels which permit the plasma in said waveguides to communicate.

4 Claims, 4 Drawing Figures

SURE-START WAVEGUIDE LASER

TECHNICAL FIELD

The field of the invention is that of an RF-discharge laser having more than one waveguide fed by a common electrode.

BACKGROUND ART

Copending U.S. patent application entitled TWIN WAVEGUIDE LASER by Peter P. Chenausky, Robert J. Mongeon, Erroll H. Drinkwater and Lanny M. Laughman, filed on or about Feb. 16, 1982, Ser. No. 348,565, shows a waveguide laser having two or more waveguides which have the same RF electrodes in common. The RF discharges in both channels in this prior art laser usually initiate simultaneously. In the case when one discharge fires and the other does not, the second discharge may be struck by temporarily increasing the applied RF power.

DISCLOSURE OF INVENTION

The invention relates to an improved multiple waveguide laser having increased reliability of firing discharges in all waveguides in which the improvement consists of adding a communicating path between the channels so that a plasma in one waveguide may communicate with the other waveguides.

BEST MODE FOR CARRYING OUT THE INVENTION

Figure 1:
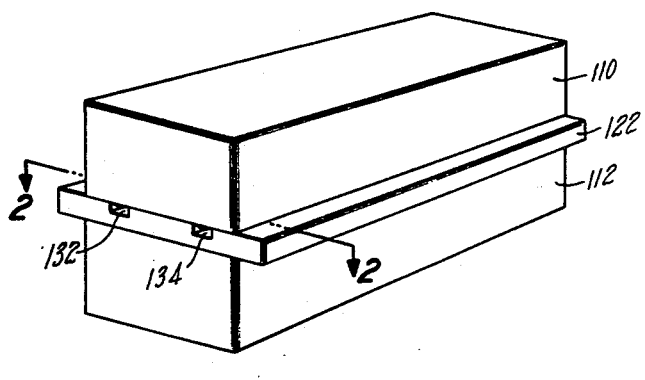
FIG. 1 illustrates a perspective view of the electrodes and waveguide channels of a prior art laser.

FIG. 1 illustrates in perspective view the electrodes and waveguides of a prior art laser in which two waveguides 132 and 134 contain RF discharges powered by electrodes 110 and 112 which are common to both waveguides. In contrast to prior art DC-discharge lasers, in which it is not possible to strike a second discharge after the first discharge has initiated, a second discharge may be initiated by momentarily increasing the applied RF power. In the case of a unit designed for field service, such as a laser radar system, it is inconvenient to check to see if both discharges have fired and to bring the second discharge up. It would be a considerable advantage to have both discharges fire essentially 100% of the time.

Figure 2:
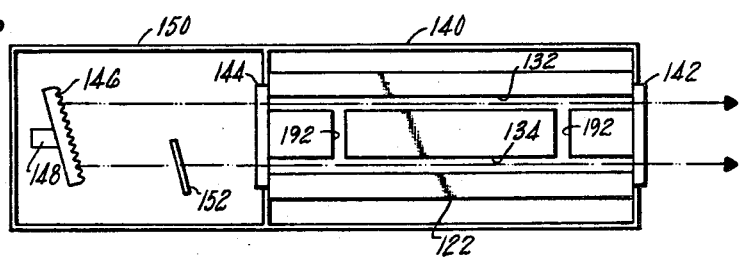
FIG. 2 illustrates a cross section of a laser having two communicating channels.

FIG. 2 illustrates a cross sectional view of an improved dual waveguide RF-discharge laser in which the reliability of firing both discharges is essentially 100%. Ceramic block 122 contains waveguides 134 and 132, as before, the unit being enclosed in gas-tight box 140 and bounded by transparent end plate 144 and partially transmitting mirror 142 as is conventional. Line selection is controlled by grating 146 adjusted by a piezoelectric transducer 148. Frequency shifter 152 is a transparent plate which serves to alter the optical path of one channel, thus producing a predictable frequency offset between the two beams. This laser is improved by the addition of two coupling ports 192 machined in block 122, which serve to couple the plasmas in the two waveguides 132 and 134. Channels 192 are fashioned at a right angle to the axes of channels 132 and 134 so that the plasmas within these two channels may communicate with one another, but there is very little interaction between the laser radiation generated in the two channels. If a discharge is initiated in only one of the two channels, the plasma formed in that channel may creep down one or both of channels 192 and initiate an RF discharge in the other channel. It has been observed that reliability of firing both channels has been increased to essentially 100% by the addition of this device.

Figure 3:
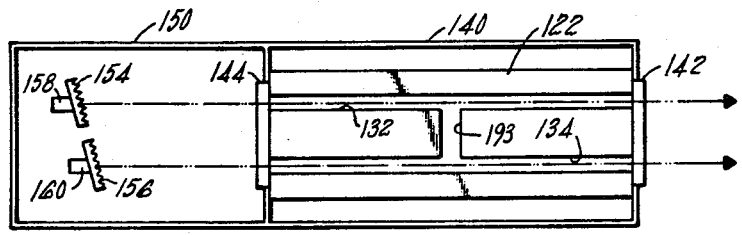
FIG. 3 illustrates a cross section of a laser having a single communicating channel.
Figure 4:
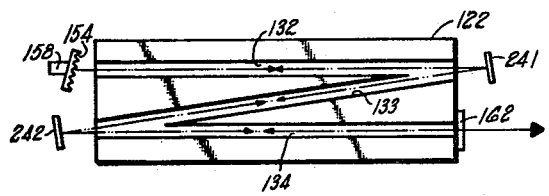
FIG. 4 illustrates a cross section of a laser in which the communicating channel also serves as a series waveguide.

FIG. 3 illustrates an alternate embodiment of the invention, in which the two channels are controlled separately by individual gratings 154 and 156 and in which there is a single coupling channel 193. The use of the single channel is advantageous in that there is only one break in the laser waveguide, and thus there is less perturbation of the mode quality within the waveguide than in the embodiment of FIG. 2. The single coupling channel 193 is shown as having a slightly greater cross section than the wveguides, so that the discharge will preferentially initiate within coupling channel 193. This preferential initiation increases the reliability of firing the discharges and compensates for the use of a single coupling device. FIG. 4 illustrates a third embodiment of the invention, in which the coupling channel extends at an acute angle between wave-guides 132 and 134 so that the three waveguides 132, 133 and 134 form a single optical cavity by means of mirrors 241 and 242 placed close to the ends of the waveguides and oriented to direct the radiation along the waveguides. Line selection is accomplished by grating 154 controlled by transducer 158 and output coupling is provided by partially reflecting mirror 162. In this embodiment, the coupling channel serves as an additional laser waveguide so that the length of the optical cavity is slightly more than three times the length of ceramic block 122. This produces an extremely compact structure useful in systems where space is a consideration. It has been observed that a discharge may initiate in one of the straight legs of this Z form and then creep along the diagonal to the other straight leg until it fills the entire volume.

We claim:

1. In an RF discharge waveguide laser including first and second RF electrodes;
  an insulating plate disposed between said first and second electrodes;
  a plurality of optical waveguides formed in said plate;
  means for resonating optical radiation within said plurality of optical waveguides;
  the improvement comprising:
  at least one coupling channel formed in said plate, said at least one coupling channel communicating between at least two of said plurality of optical waveguides.

2. A laser according to claim 1 in which two of said plurality of optical waveguides are disposed within said plate parallel to one another and said at least one coupling channel is formed substantially at a right angle to said parallel waveguides whereby said optical radiation is substantially unaffected by said coupling channel.

3. A laser according to claim 2, in which each of said two of said plurality of waveguides has a first cross-sectional area and said at least one coupling channel has a second cross-sectional area greater than said first cross-sectional area.

4. A laser constructed according to claim 1 in which a pair of parallel optical waveguides are formed in said plate and a coupling channel extends from a first end of one of said waveguides diagonally to an opposite second end of the other of said waveguides.

* * * * *